Sept. 2, 1947.  A. R. HENRY  2,426,687
HAY STACKER ATTACHMENT FOR TRACTORS
Filed May 29, 1945  3 Sheets-Sheet 3
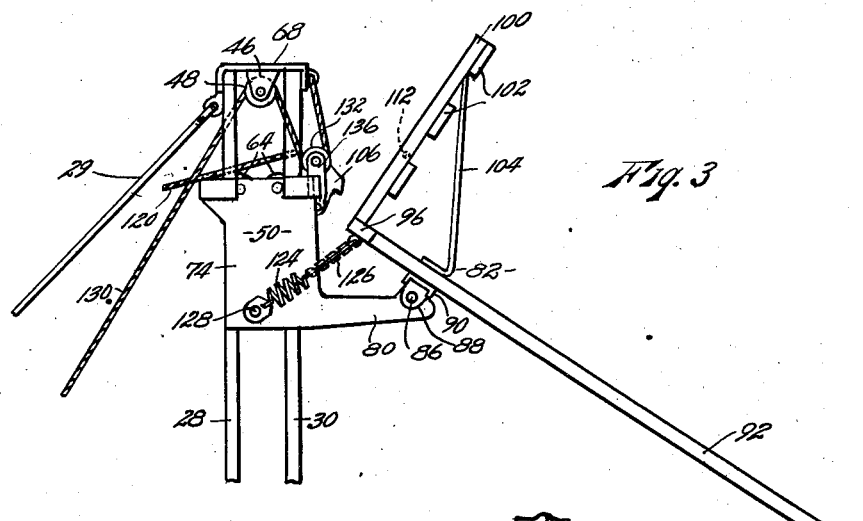
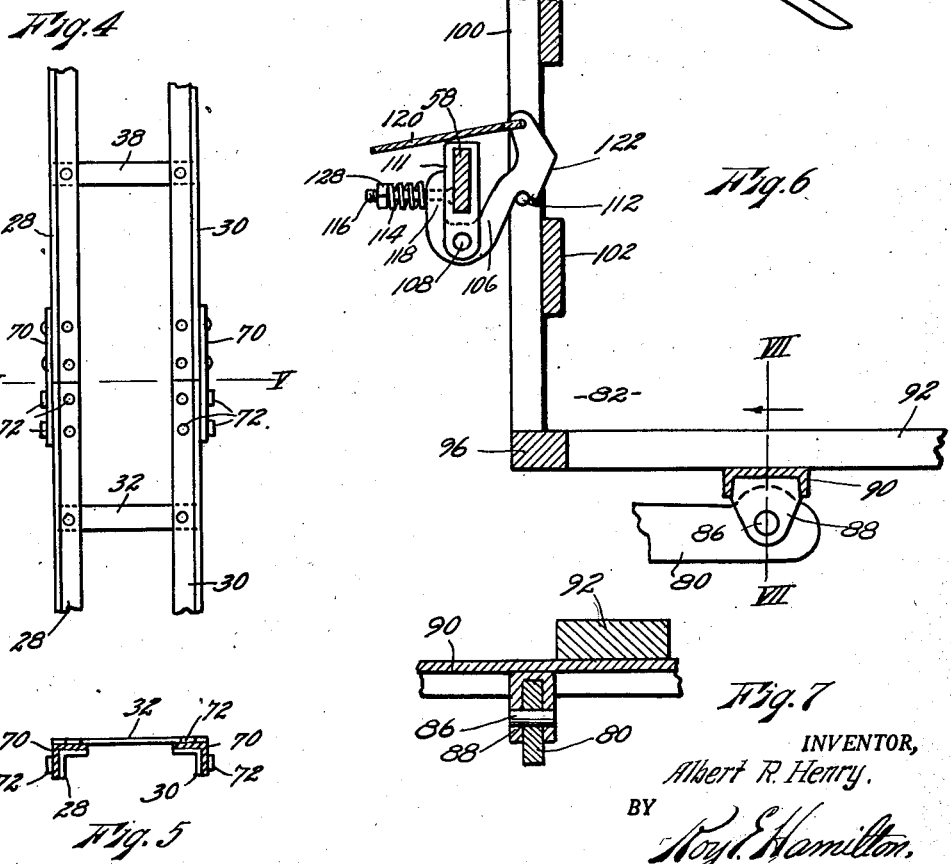
INVENTOR,
Albert R. Henry.
BY
Roy E. Hamilton,
Attorney.

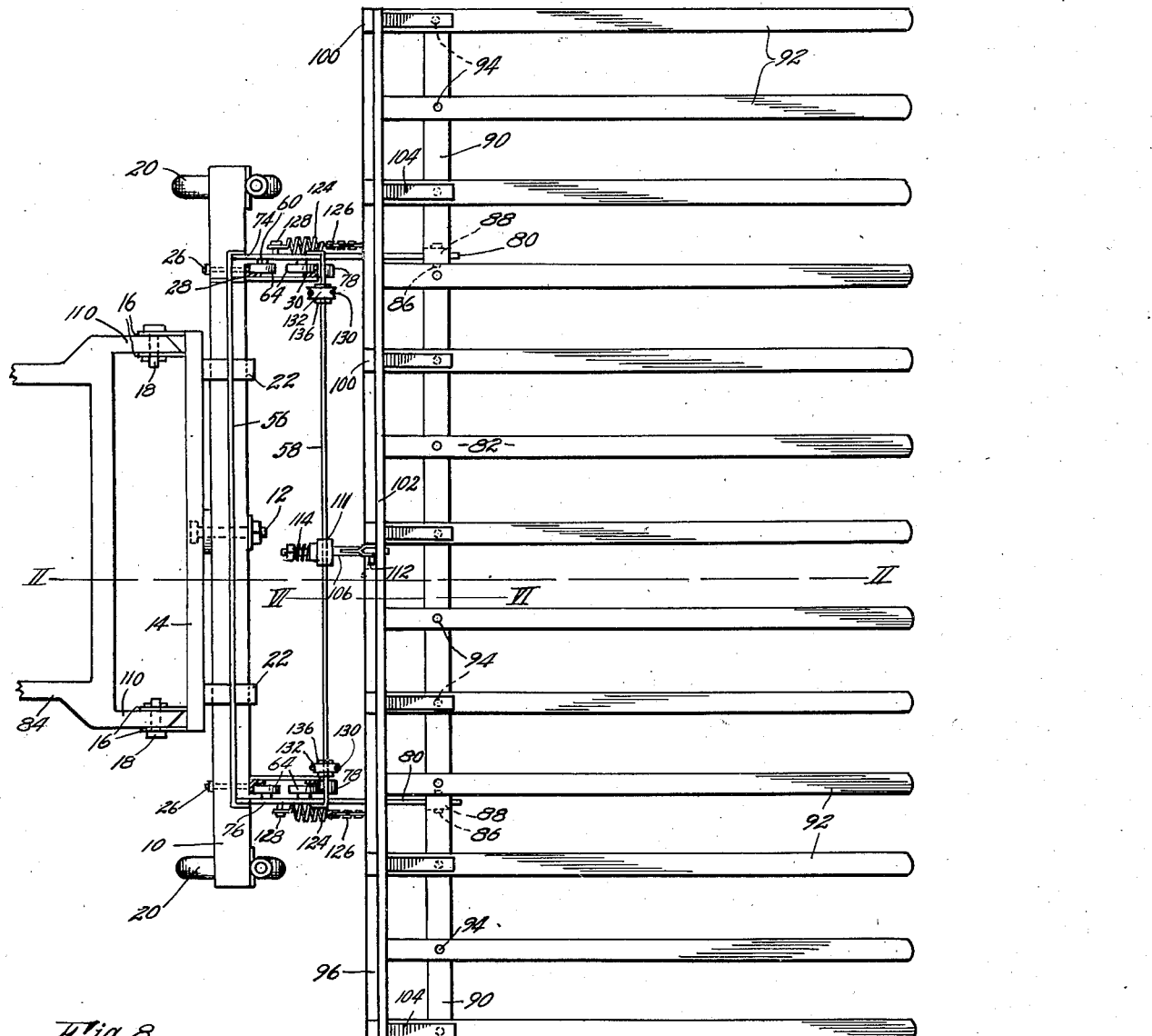
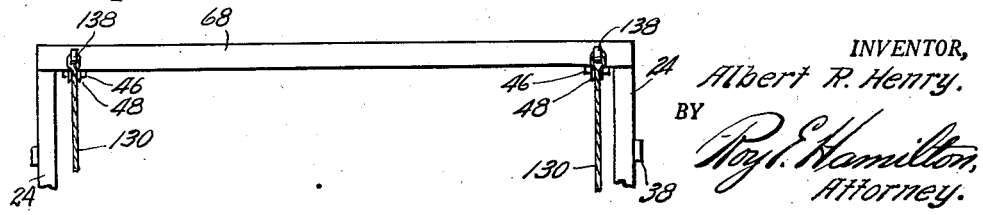

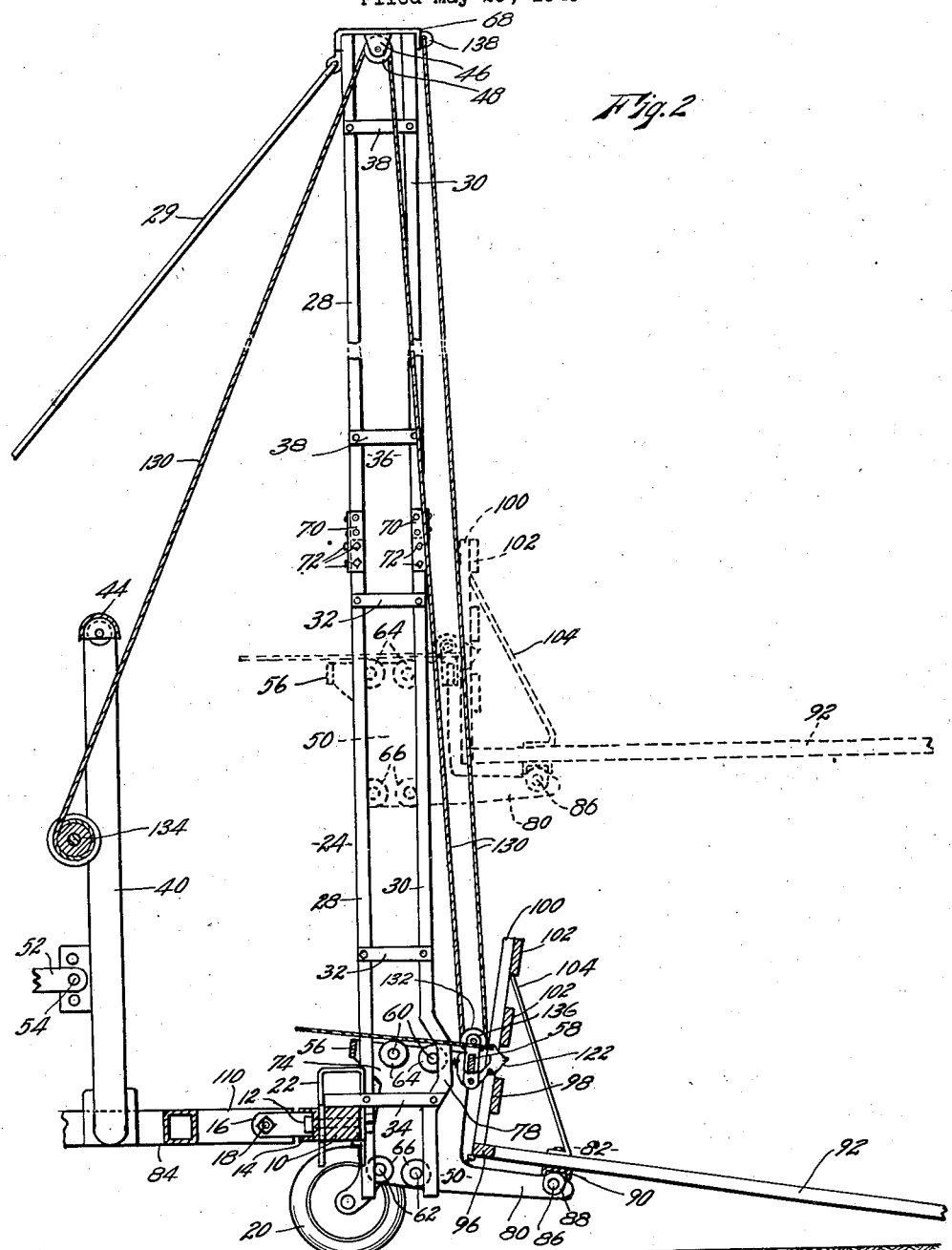

Patented Sept. 2, 1947

2,426,687

UNITED STATES PATENT OFFICE 2,426,687

HAYSTACKER ATTACHMENT FOR TRACTORS

Albert R. Henry, Salina, Kans., assignor to Henry Manufacturing Company, Inc., Topeka, Kans., a corporation of Kansas Application May 29, 1945, Serial No. 596,529

6 Claims. (Cl. 214—113)

This invention relates to improvements in hay stacker attachments for tractors for handling various kinds of material, to gather said materials and place them on a conveyance or stack, and has for its principal object the provision of a device of this character which may be readily installed on the conventional type of tractor and receive power therefrom for its operation, being under direct control of the operator of the tractor.

It is contemplated that this stacker attachment shall be mounted on a tractor having certain associated parts such as shown in my copending application, Serial No. 564,095, filed November 18, 1944, for "loading device."

The principal feature of this invention is the provision of means for automatically tilting the hay fork to the loading position.

Other objects are simplicity and economy of construction, ease of operation and adaptability for use on the various types of farm tractors.

With these and other objects in view the invention consists in certain novel features of construction, combination and arrangement of parts to be hereinafter more fully described and claimed, reference will now be had to the drawings, wherein:

Fig. 1 is a plan view, partly in section, of a hay stacker attachment for tractors embodying this invention.

Fig. 2 is a vertical sectional view taken on line II—II of Fig. 1 with the hay fork shown in the lowered loading position in solid lines and in the partially raised position in dotted lines.

Fig. 3 is a side elevational view of the upper portion of the stacker with the hay fork shown in the dumping position.

Fig. 4 is an enlarged elevational view of the vertical guide standard showing the joint thereof.

Fig. 5 is a horizontal cross sectional view taken on line V—V of Fig. 4.

Fig. 6 is an enlarged sectional view taken on line VI—VI of Fig. 1.

Fig. 7 is a sectional view taken on line VII—VII of Fig. 6.

Fig. 8 is a fragmentary front elevation of the upper portion of the standards and header.

Throughout the several views of the drawings like reference characters refer to similar parts and for convenience the parts of the equipment shown in my application, Serial No. 564,095 have been given the same identification numerals as in said application.

The parts thus shown include the frame 40 pivotally mounted at 54 to a bracket 52 which is mounted on the tractor frame, also the cable drum 134 carried by the frames and the boom 48 having arms 110 to which the hay stacking attachment is secured.

This hay stacking attachment comprises a cross beam frame 10 disposed horizontally and pivotally mounted at 12 to a cross channel member 14 having transversely disposed plates 16 at its opposite ends to receive the respective arms 110 therebetween. A pivot pin 18 passing through said plate 16 and the end portion of the boom arms 110 form a flexible pivotal connection to the tractor structure. The cross beam 10 is longer than the channel member 14 and is provided at its outer extremities with tiller wheels 20 which support the principal load of the stacker and follow the contour of the ground.

The boom, as described in our previous application, is pivotally mounted so as to allow for slight variations for the proper contact of the tiller wheels 20 on the ground. To stabilize and prevent too great relative movement of the pivotal adjustment of the cross beam 10 during the operation of the machine, U-shape guide members 22 are positioned respectively at opposite sides of pivot 12 as shown. Intermediate each of the tiller wheels 20 and adjacent guide members 22 is a vertically disposed standard 24 which is rigidly secured to cross beam 10 by means of bolts 26. This standard comprises two spaced apart angle irons 28 and 30 joined together by cross bars 32 and 34. The cross bar 34 adjacent the lower end of said angles extends outwardly to rest on top of cross beam 10, thus serving to better support the load exerted on said standard. This standard is provided with a similar extension comprising angle bars 28 and 30 joined together by cross bars 38 and having a header 68 which extends across to a like standard at the opposite end portion of beam 10. This header 68 is of proper length to maintain the two vertical standards in parallel relation. Extension 36 is provided with angle iron sections 70 which are rigidly attached thereto and these are removably attached to the upper end of standard 24 by bolts 44 thus making it possible to remove the extension 36 and operate the hay fork through a shorter lift. A truss rod 29 secured to header 68 serves to maintain the forwardly loaded parts in proper vertical relation when secured to parts of the carrying vehicle, not shown. Header 68 is provided with brackets 46 carrying sheave wheels 48.

A vertically movable carriage 50 comprising end plates 74 and 76 and cross bars 56 and 58 are constructed to encompass said standards and to serve as tracks for guiding the carriage in its travel from the loading to the dumping position. Each of the plates 74 and 76 is provided with a pair of inwardly projecting trunnions 60 adjacent the top thereof and a pair of trunnions 62 adjacent the bottom to receive respectively rollers 64 and 66. It will be noted that these rollers are so spaced and positioned as to operatively fit between the two angle bars 28 and 30 and that the pairs of rollers are so spaced apart vertically as to support the carriage in predetermined positions.

The front standard angle bar 30 is offset at 78 to extend outwardly to permit tilting of the carriage 50 from its normal vertical position. Referring to Fig. 2, it will be noted that the carriage, as shown in solid lines, is tilted forwardly at its upper portion for reasons hereinafter set forth and in dotted lines the carriage is shown in the normal vertical position.

The carriage end plates 74 and 76 are each provided with a forwardly extended arm 80, to which is pivotally mounted a hay fork 82 by means of pins 86 which engage brackets 88 carried by the base channel iron 90 of the hay fork. Tines or teeth 92 of the hay fork 82 are secured by rivets 94 to base channel 90 intermediate their ends and are secured together at their rear ends by a cross bar 96 whereby the teeth are secured in substantially parallel relation. A back board 98 comprising vertical posts 100 mounted on cross bar 96 and carrying spaced apart cross slots 102 and secured in upright position by suitable base bars 104 serves as an abutment for the material being handled.

A latch member 106 pivotally mounted at 108 to a bracket 111 carried by cross bar 58 engages pin 112 mounted in one of the posts 100 to normally secure the hay fork 82 in fixed relation to the carriage 50. A spring 114 adjustably carried by bolt 116 which is secured to cross bar 58, rests against a tongue 118 of latch member 106 to maintain it in latched position. Latch member may be operated from a remote point by pull member 120 which urges the latch away from pin 112 against spring 114. When so released, the fork will fall to the dumping position. The inclined face 122 of latch 106 is so positioned that as the fork is raised, pin 112 will engage said face and move the latch 106 to engage pin 112.

Means for limiting the drop of the fork comprises a combined buffer spring 124 and a stop chain 126 secured at its one end to a pin 128 carried by the respective end plates 74 and 76, and at its other end to the cross bar 96.

Carriage 50 is adapted to be raised and lowered along the track standards by means of cables 130 which are operable by the drum 134 in a manner described in my copending application referred to above. This cable extends over the sheave wheel 48, thence downwardly and around sheave wheel 132 mounted in bracket 136 carried by carriage cross bar 58, then passes upwardly where it is securely attached at 138 to the header member 68.

In the operation of the stacker, the fork 82 is lowered to position shown in solid lines in Fig. 2. It will be noted that when so positioned, the upper rollers 64 of the carriage will move forward into the offset portion 78 of the track standard 24, thus causing the outer extremity of the fork teeth 92 to be lowered to substantially the ground level so that as the tractor and stacker structure are moved forwardly, the hay or other material will be positioned on the fork for raising. After the fork is loaded, the operator causes the rotation of drum 134 to wind cable 130 thereon to raise the carriage and loaded fork 82. It will be noted that when the fork is moving upwardly, it is maintained in a substantially horizontal position, thus preventing any slippage of the load from the fork. When the load has reached the desired height on the track standards, the operator simply pulls the release cord or pull member 120 to permit the fork to take the dumping position as shown in Fig. 3. The resilient spring 124 will prevent the movement of the fork to an objectionable angle.

It is quite apparent that the loaded fork may be dumped at any desired vertical position by simply operating the latch member. It will be noted that the carriage and fork are so constructed and positioned that the forward roller 64 and the rear roller 66 will engage the tracks 30 and 28 respectively, thus insuring the proper tilting of the fork during the loading operation. The supporting wheels 20 carry most of the load of the stacker attachment and also serve to maintain the fork in substantially parallel relation with the contour of the ground. It will be noted that these wheels are mounted on the cross beam 10 which in turn is pivoted to the cross channel member 14, thus permitting transverse vertical tilting of the beam. Furthermore, cross channel member 14 is pivotally mounted at right angles to the beam pivot 12, thus providing a limited universal movement of the stacker structure. The extension 36 of standard 24 may be removed and the head member 68 attached to the upper end of the fixed standard 24 when the material is to be raised only a short distance.

It is apparent that various minor changes might be made in the size and arrangement of parts without departing from the spirit of the invention.

Having thus described my invention, what I claim as new and desire to secure by Letters Patent is:

1. A stacker attachment adapted to be mounted on and operated by a tractor, comprising a frame pivotally attached to the forward end of said tractor for transverse movement and having supporting wheels, a pair of spaced apart track standards pivoted for transverse movement and extending upwardly from said frame, a transversely offset section adjacent the lower extremity of each of said track standards, a carriage having vertically offset guide rollers at its opposite ends to operatively engage respectively each of said track standards, and means to move said guide rollers in said track standards whereby as said rollers move to and from the offset portion of said standards the carriage is tilted.

2. A stacker attachment adapted to be attached to and operated by a tractor, comprising a frame attached to the forward end of said tractor and having supporting wheels, a pair of spaced apart track standards pivoted for transverse movement to said frame and extending upwardly from said frame, a transversely offset section adjacent the lower extremity of each of said track standards, a carriage having vertically offset guide rollers at its opposite ends to operatively engage respectively each of said track standards, a fork pivotally carried by said carriages, means to normally secure said fork in the load carrying position, and manually controlled means for raising and lowering said carriage to and from the offset portion of said track standard whereby the fork is tilted.

3. A stacker attachment adapted to be mounted on and operated by a tractor, comprising a frame carried by limited pivotal adjustment on said tractor and having supporting wheels, a pair of spaced apart track standards pivoted to and extending upwardly from said frame and each having an offset portion adjacent its lower end, a carriage having vertically spaced apart guide rollers mounted on said track standards operable to cause a tilting of said carriage as the upper rollers move into the offset portion of said track standards, a material carrying fork tiltably mounted on said carriage, and manually operable means to normally secure said fork in the loading position.

4. A stacker attachment adapted to be mounted on and operated by a tractor, comprising a frame carried for limited universal movement on said tractor and having supporting ground wheels, a pair of spaced apart sectional track standards joined together and pivoted for transverse movement to and extending upwardly from said frame each having an offset portion adjacent its lower end, a carriage having vertically spaced apart guide rollers mounted on said track standards and operable to cause a tilting of said carriage as the upper rollers move into the offset portion of said track standards, a material carrying fork tiltably mounted on said carriage, manually operable means to normally secure said fork in the loading position, and resilient means to limit the tilting of said fork.

5. A stacker attachment adapted to be mounted on and operated by a tractor, comprising a frame carried for limited pivoted adjustment by said tractor and having supporting wheels, a pair of spaced apart transversely adjustable track standards extending upwardly from said frame each having an offset portion adjacent its lower end, a carriage having a set of vertically spaced apart rollers at its opposite ends to respectively engage said track standards and being operable to cause a tilting of said carriage as they are moved to and from the offset portion of said track standard, a material carrying member tiltably mounted on said carriage, and means operable by said tractor for raising and lowering said carriage.

6. A stacker attachment adapted to be mounted on and operated by a tractor, comprising a track frame pivotally mounted adjacent its center portion for limited transverse movement to a frame member carried for pivotal movement on the forward end of said tractor, tiller wheels for supporting said beam on the ground; a pair of parallel spaced apart track standards extending vertically above said stacker attachment frame and having like offset portions, a carriage having a set of vertically spaced apart rollers at its opposite ends to respectively engage said track standards, manually controlled means for raising and lowering said carriage whereby it is tilted when entering and leaving said offset portion of the track standards, a fork pivotally mounted on said carriage for tilting, means for limiting the tilting of said fork, and latch means for normally securing said fork and carriage in relative fixed relation.

ALBERT R. HENRY.

REFERENCES CITED

The following references are of record in the file of this patent:

UNITED STATES PATENTS

| Number | Name | Date |
| --- | --- | --- |
| 1,426,116 | Simons | Aug. 15, 1922 |
| 1,863,505 | Schon | June 14, 1932 |
| 1,912,816 | Anthony | June 6, 1933 |
| 2,099,604 | Gunning | Nov. 16, 1937 |
| 2,295,895 | Duden | Sept. 15, 1942 |
| 2,320,600 | Howell | June 1, 1943 |
| 2,323,605 | Johnson | July 6, 1943 |
| 2,351,926 | Coates | June 20, 1944 |
| 2,372,870 | Willrodt | Apr. 3, 1945 |